(12) United States Patent
Bercow et al.

(10) Patent No.: US 10,235,505 B2
(45) Date of Patent: *Mar. 19, 2019

(54) ENABLING ENFORCEMENT OF LICENSING TERMS IN DISTRIBUTING CONTENT IN CONTAINERS BY INCLUDING A KEY IN THE CONTAINER CONTAINING THE PERTINENT LICENSING TERMS

(71) Applicant: International Business Machines Corporation, Armonk, NY (US)

(72) Inventors: Paul M. Bercow, Katonah, NY (US); Daniel E. Kloud, New Canaan, CT (US); Victor S. Moore, Lake City, FL (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,749

(22) Filed: Nov. 28, 2017

(65) Prior Publication Data

US 2018/0082046 A1 Mar. 22, 2018

Related U.S. Application Data

(63) Continuation of application No. 15/184,074, filed on Jun. 16, 2016, now Pat. No. 9,922,177, which is a (Continued)

(51) Int. Cl.
*G06F 21/10* (2013.01)
*G06Q 50/18* (2012.01)
(Continued)

(52) U.S. Cl.
CPC ........ *G06F 21/105* (2013.01); *G06F 11/0784* (2013.01); *G06F 21/31* (2013.01);
(Continued)

(58) Field of Classification Search
CPC ....... H04L 63/10; H04L 63/20; G06F 11/0784
See application file for complete search history.

(56) References Cited

U.S. PATENT DOCUMENTS 6,189,146 B1 2/2001 Misra et al.
6,629,150 B1 9/2003 Huded
(Continued)

FOREIGN PATENT DOCUMENTS

GB 2462442 A 2/2010

OTHER PUBLICATIONS

Petazzoni "Docker Can Now Run Within Docker", Sep. 5, 2013, 14 pages (Year: 2013).*

(Continued)

*Primary Examiner* — Oleg Korsak
(74) *Attorney, Agent, or Firm* — Robert A. Voigt, Jr.; Winstead, P.C.

(57) ABSTRACT

A method, system and computer program product for enforcing licensing terms when distributing content via a container image running in a container. Upon receiving a request for a service from the container by the isolation code, where the isolation code limits, accounts and isolates resource usage of process groups, the commerce code application programming interfaces (APIs) of the isolation code read a key of the container. The key contains licensing terms applied to the component(s) (e.g., applications) of the container. The commerce code APIs will then confirm that the container is in compliance with those licensing terms. If the container is in compliance with the licensing terms, the container will be allowed to execute. Otherwise, the container will be prevented from executing. In this manner, the commerce code APIs can enforce the licensing terms, including restrictions and enforcement of payment to the licensor upon distributing content in the container.

20 Claims, 5 Drawing Sheets

Related U.S. Application Data continuation of application No. 14/537,567, filed on Nov. 10, 2014, now Pat. No. 9,449,353.

(51) Int. Cl.
*G06F 11/07* (2006.01)
*H04L 29/06* (2006.01)
*G06F 21/31* (2013.01)

(52) U.S. Cl.
CPC .......... *G06Q 50/184* (2013.01); *H04L 63/10* (2013.01); *H04L 63/20* (2013.01); *G06Q 2220/18* (2013.01)

(56) References Cited

U.S. PATENT DOCUMENTS

| | | |
|---|---|---|
| 7,065,650 B2 | 6/2006 | Collins et al. |
| 7,313,512 B1 | 12/2007 | Traut et al. |
| 8,763,159 B1 | 6/2014 | Kobets et al. |
| 9,009,840 B1 | 4/2015 | Stickle |
| 2003/0061463 A1 | 3/2003 | Tibbetts |
| 2007/0156719 A1 | 7/2007 | Upendran et al. |
| 2011/0047624 A1 | 2/2011 | Vedantam et al. |
| 2014/0245025 A1 | 8/2014 | Fairless |

OTHER PUBLICATIONS

List of IBM Patents or Patent Applications Treated as Related, Mar. 15, 2018, pp. 1-2.

List of IBM Patents or Patent Applications Treated as Related, Nov. 28, 2017, pp. 1-2.

Office Action for U.S. Appl. No. 15/922,411 dated May 30, 2018, pp. 1-16.

\* cited by examiner

US 10,235,505 B2

ENABLING ENFORCEMENT OF LICENSING TERMS IN DISTRIBUTING CONTENT IN CONTAINERS BY INCLUDING A KEY IN THE CONTAINER CONTAINING THE PERTINENT LICENSING TERMS

TECHNICAL FIELD

The present invention relates generally to assembling applications within a container, and more particularly to enabling enforcement of licensing terms in distributing content in containers by including a key in the container containing the pertinent licensing terms.

BACKGROUND

Currently, developers may assemble applications within a "container." The contents of the container (e.g., applications) may then be copied into an image file, which can later be used to create an exact duplicate of the container from which the image was created. Once the image is created, operations to build another container from that image, and the container commands, such as to run, start, stop, commit and search, are the same regardless of the container contents.

Images can be instantiated into containers on a system, such as a Linux® system. The distributed content in these images may have licensing restrictions, including licensing terms that require compensation to licensors when such content is distributed, such as when an image of the contents of the container is copied or distributed to another container. However, there is not currently a means for enforcing the licensing restrictions when distributing the content in the containers, including enforcement of payment to the licensor upon distributing the content in the containers.

SUMMARY

In one embodiment of the present invention, a computer program product for enforcing licensing terms when distributing content via a container image running in a container, the computer program product comprising a computer readable storage medium having program code embodied therewith, the program code comprising the programming instructions for executing a boot code upon loading the container, where the boot code is an execution entry point of the container. The program code further comprises the programming instructions for determining whether a key of the container is validated with commerce code by the boot code, where the key comprises licensing terms applied to the contents of the container. The program code additionally comprises the programming instructions for allowing the container to execute in response to the key being validated.

In another embodiment of the present invention, a system comprises a memory unit for storing a computer program for enforcing licensing terms when distributing content via a container image running in a container. The system further comprises a processor coupled to the memory unit, where the processor is configured to execute the program instructions of the computer program comprising executing a boot code upon loading the container, where the boot code is an execution entry point of the container. The program instructions of the computer program further comprises determining whether a key of the container is validated with commerce code by the boot code, where the key comprises licensing terms applied to the contents of the container. The program instructions of the computer program additionally comprises allowing the container to execute in response to the key being validated.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for enforcing licensing terms when distributing content via a container image running in a container. A container is an operating system process that is assigned to an application program and is isolated from all the other processes by code running within the operating system. This code is called "process isolation code" or simply "isolation code," an example of which is control groups or "cgroups" in Linux®. In one embodiment of the present invention, upon receiving a request for a service from a container by the isolation code, where the isolation code is a program to limit, account and isolate resource usage (e.g., CPU, memory, disk input/output, etc.) of process groups, the commerce code application programming interfaces (APIs) of the isolation code read a key of the container. The key contains licensing terms applied to one or more components (e.g., applications) of the container. The commerce code APIs will then confirm that the container is in compliance with those licensing terms. If the container is in compliance with the licensing terms, the container will be allowed to execute. Otherwise, the container will be prevented from executing. In this manner, the commerce code APIs can enforce the licensing terms, including restrictions and enforcement of payment to the licensor upon distributing content in the container.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
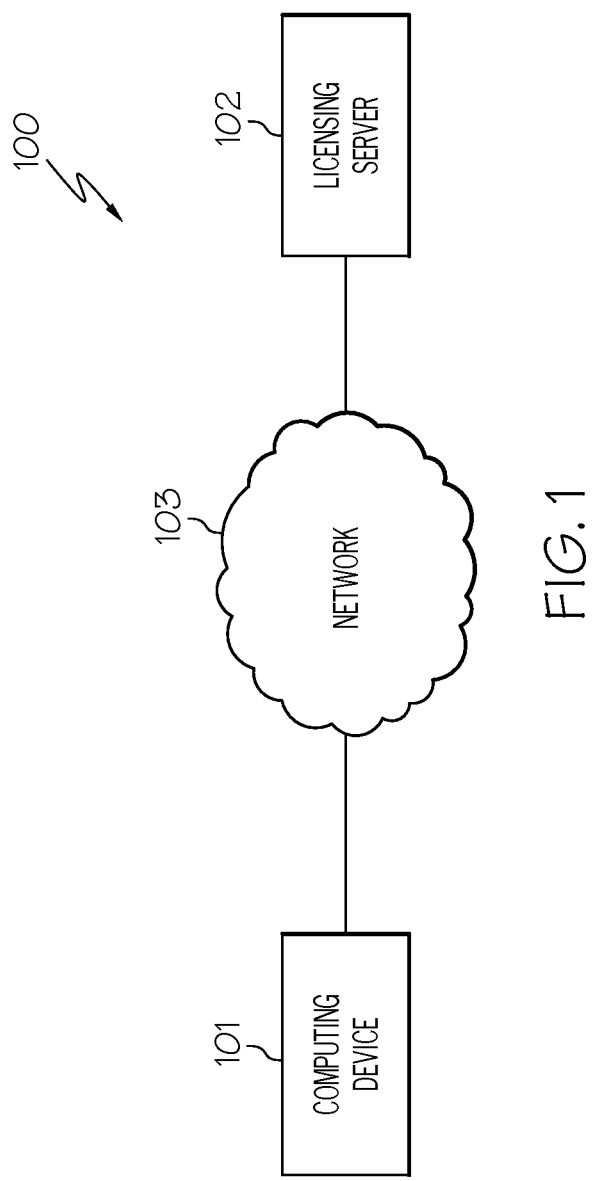
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a computing device 101 connected to a licensing server 102 via a network 103. Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to licensing server 102 via network 103. A hardware configuration of a computing device 101 is discussed below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Licensing server 102 is configured to manage licenses as well as used to validate licenses, such as validating a license code applied to a licensing provision, as discussed further below in connection with FIG. 5.

Figure 2:
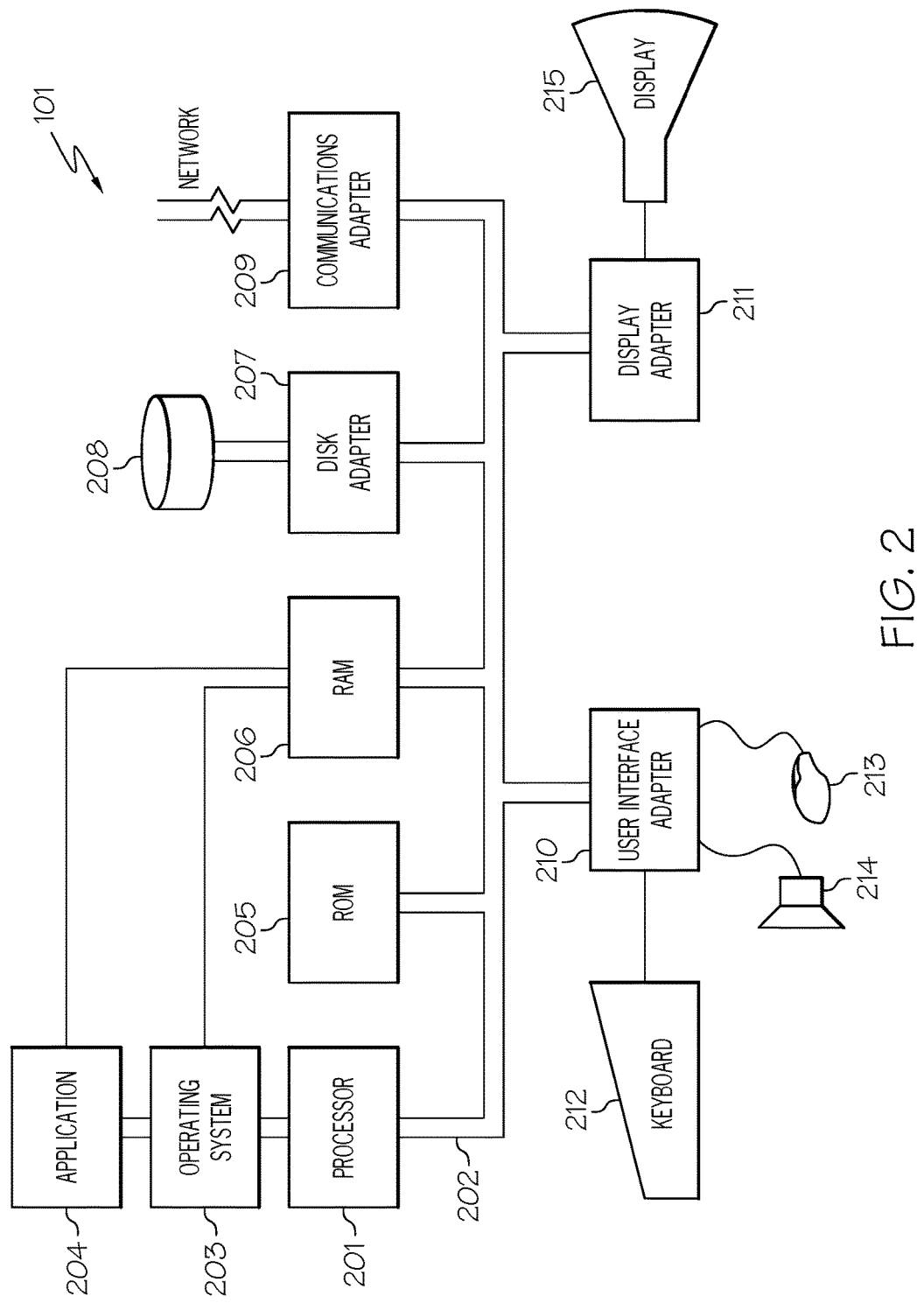
FIG. 2 illustrates a hardware configuration of a computing device for practicing the principles of the present invention in accordance with an embodiment of the present invention.

Referring now to FIG. 2, FIG. 2 illustrates a hardware configuration of a computing device 101 (FIG. 1) for practicing the principles of the present invention in accordance with an embodiment of the present invention.

As illustrated in FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for enforcing licensing terms when distributing content in containers as discussed below in association with FIGS. 3-5.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for enforcing licensing terms when distributing content in containers, as discussed below in association with FIGS. 3-5, may reside in disk unit 208 or in application 204.

Computing device 101 may further include a communications adapter 209 coupled to bus 202. Communications adapter 209 interconnects bus 202 with an outside network (e.g., network 103 of FIG. 1) thereby enabling computing device 101 to communicate with other devices, such as licensing server 102 (FIG. 1).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, developers may assemble applications within a "container." The contents of the container (e.g., applications) may then be copied into an image file, which can later be used to create an exact duplicate of the container from which the image was created. Once the image is created, operations to build another container from that image, and the container commands, such as to run, start, stop, commit and search, are the same regardless of the container contents. Images can be instantiated into containers on a system, such as a Linux® system. The distributed content in these images may have licensing restrictions, including licensing terms that require compensation to licensors when such content is distributed, such as when an image of the contents of the container is copied or distributed to another container. However, there is not currently a means for enforcing the licensing restrictions when distributing the content in the containers, including enforcement of payment to the licensor upon distributing the content in the containers.

Figure 3:
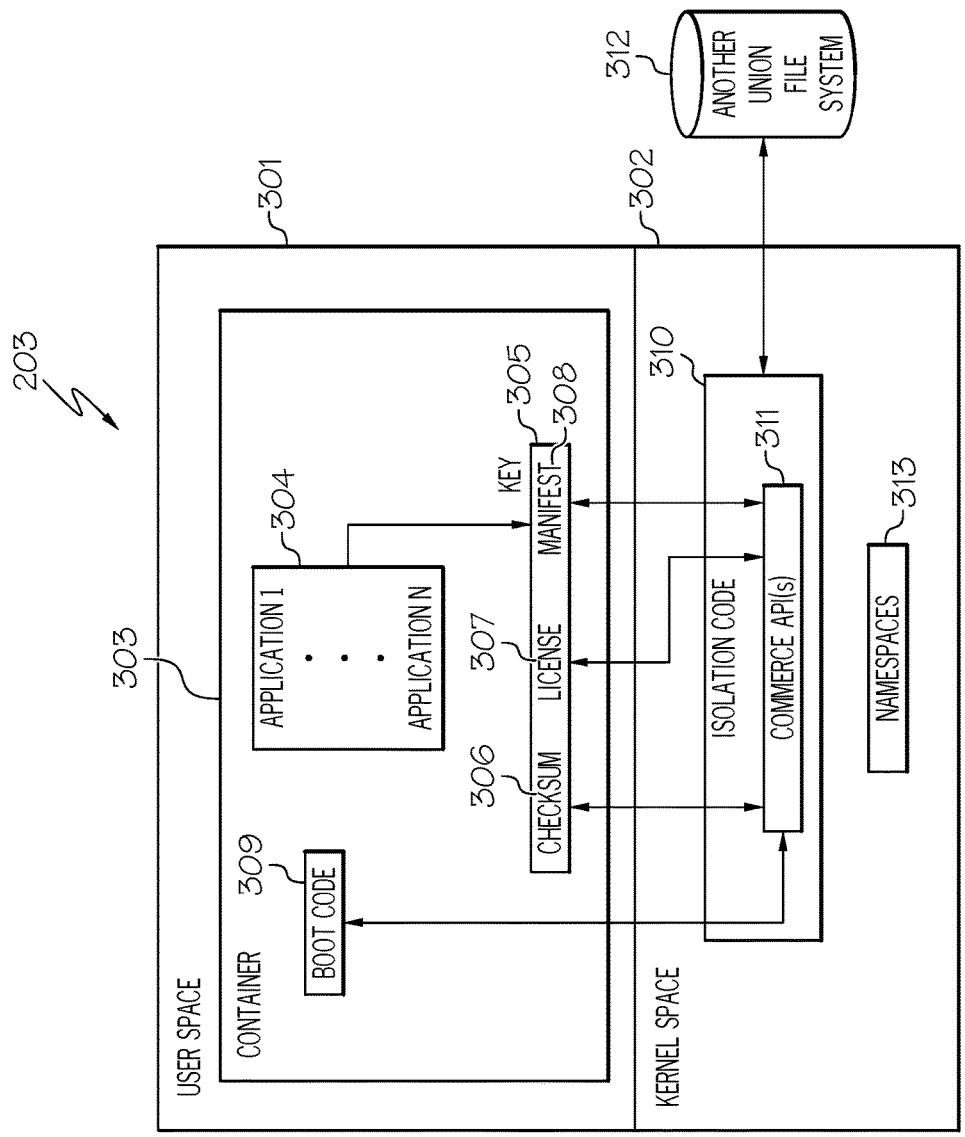
FIG. 3 is a diagram of the software components used in connection with enforcing licensing terms when distributing content in containers in accordance with an embodiment of the present invention.
Figure 4:
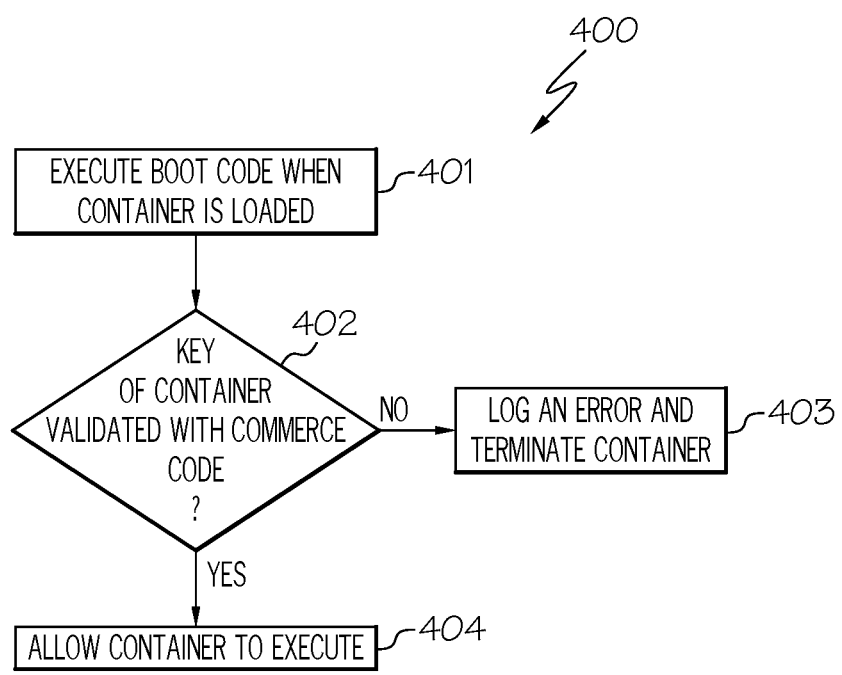
FIG. 4 is a flowchart of a method for validating the key in the container with the commerce code in the isolation code in accordance with an embodiment of the present invention.
Figure 5:
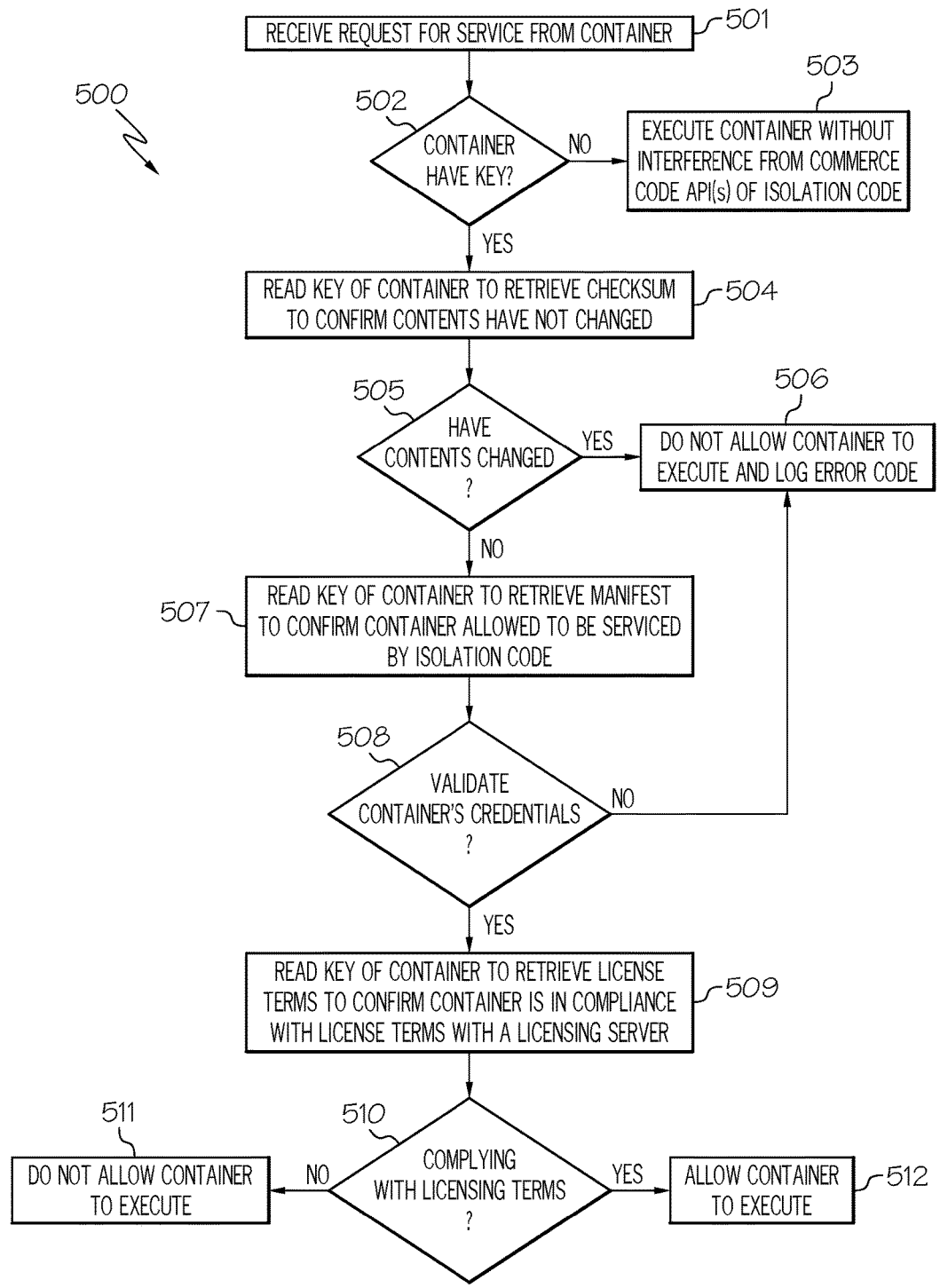
FIG. 5 is a flowchart of a method for enforcing the licensing terms when distributing content in containers in accordance with an embodiment of the present invention.

The principles of the present invention provide a means for enforcing licensing terms, including restrictions and enforcement of payment to the licensor upon distributing content in containers by including a key in the container that is used by the application programming interface of the commerce code in the isolation code (isolation code is a program to limit, account and isolate resource usage of process groups) to ensure compliance with the licensing terms as discussed below in connection with FIGS. 3-5. FIG. 3 is a diagram of the software components used in connection with enforcing licensing terms when distributing content in containers. FIG. 4 is a flowchart of a method for validating the key in the container with the commerce code in the isolation code. FIG. 5 is a flowchart of a method for enforcing the licensing terms when distributing content in containers.

As stated above, FIG. 3 is a diagram of the software components used in connection with enforcing licensing terms when distributing content in containers in accordance with an embodiment of the present invention.

Referring to FIG. 3, a conventional operating system 203 (FIG. 2) usually segregates the virtual memory into user space 301 and kernel space 302. User space 301 is the memory area where all user mode applications work; whereas, kernel space 302 is strictly reserved for running the kernel, kernel extensions, and most device drivers.

User space 301 includes a container 303 whose contents include an assemble of applications 304 (identified as "Application 1 . . . Application N," where N is a positive integer number, in FIG. 3). "Container 303," as used herein, is an operating system process that is assigned to an application program and is isolated from all the other processes by code running within operating system 203. This code is called "process isolation code" or simply "isolation code," an example of which is control groups or "cgroups" in Linux®.

Container 303 further includes a key 305 containing a checksum 306, licensing terms 307 and a manifest 308. Checksum 306, which is a small-sized datum from an arbitrary block of digital data, is used to confirm that the contents, such as applications 304, of container 303 have not changed. Licensing terms 307 refer to the licensing terms, such as the licensing restrictions and payment requirements for distributing the contents, such as applications 304, of container 303. In addition to the licensing terms relating to the payment terms for distributing applications 304, licensing terms may include restrictions, such as the amount of resources (e.g., CPU cycles, memory and disk storage) to be utilized based on the price paid. In one embodiment, licensing terms 307 may apply to one or more particular components (e.g., applications 304) of container 303. In one embodiment, each component (e.g., application 304) of container 303 is associated with a particular licensing term 307 stored in key 305. Manifest 308 refers to a file that lists the contents of container 303 as well as the security credentials of container 303 thereby effectively proving the identity of container 303. In one embodiment, key 305 may further contain information directed to the preferred provisioning of applications 304, such as the type of database, security authority, etc.

Furthermore, container 303 may optionally include boot code 309 which is the container's 303 execution entry point. Boot code 309 is executed upon loading container 303 which then communicates with an application programming interface of the commerce code 311 of the isolation code 310 (discussed further below) to determine if the respective container 303 is eligible for execution as discussed further below in connection with FIG. 4. In one embodiment, boot code 309 is replaced by adding a field to key 305 that the commerce code 311 in isolation code 310 would use to decrypt portions or the entirety of applications 304 in container 303. Consequently, the image would be prevented from being executed on a system without an isolation code 310 with the embedded commerce code 311.

Kernel space 302 includes a software component referred to as isolation code 310. Isolation code 310 (e.g., control groups or "cgroups" of Linux®) is a program running on the kernel to limit, account and isolate resource usage (e.g., CPU, memory, disk input/output, etc.) of process groups. A "process group" denotes a collection of one or more processes.

In one embodiment, isolation code 310 includes commerce code with application programming interfaces 311 (also referred to as "commerce code APIs") which are used to validate key 305 of container 303 as well as enforce licensing terms 307 as discussed further below in connection with FIG. 5. In one embodiment, the commands from container 303 are encrypted (discussed further below in connection with FIGS. 4 and 5), where the encrypted commands are decrypted by application programming interfaces of commerce code 311.

Isolation code 310 may interact with a file system referred to herein as an "another union file system" 312. Another union file system 312 takes an existing filesystem and transparently overlays it on a newer filesystem. It allows files and directories of separate filesystems to co-exist. Furthermore, another union file system 312 can merge several directories and provide a single merged view of it.

Kernel space 302 further includes namespaces 313 which provide a level of direction to specific identifiers, thus making it possible to distinguish between identifiers with the same exact name. In one embodiment, namespaces 313 are employed for the purpose of grouping symbols and identifiers around a particular functionality. In one embodiment, namespaces 313 provide "isolation," where groups of processes are separated such that they cannot "see" resources in other groups. For example, a PID namespace provides a separate enumeration of process identifiers within each namespace. Another example includes a network namespace that isolates the network interface controllers (physical or virtual), iptables firewall rules, routing tables, etc. Network namespaces can be connected with each other using the "veth" virtual Ethernet device. A further example includes the "UTS" namespace that allows changing the hostname. In another example, the mount namespace allows creating a different file system layout or making certain mount points read-only. In a further example, the "IPC" namespace isolates the System V inter-process communication between namespaces. In another example, the user namespace isolates the user IDs between namespaces.

As discussed above, in the embodiment with container 303 containing boot code 309, boot code 309 is executed upon loading container 303 which then communicates with an application programming interface of commerce code 311 of isolation code 310 to determine if the respective container 303 is eligible for execution as discussed further below in connection with FIG. 4.

FIG. 4 is a flowchart of a method 400 for validating key 305 (FIG. 3) in container 303 (FIG. 3) with commerce code 311 (FIG. 3) in isolation code 310 (FIG. 3) in accordance with an embodiment of the present invention.

Referring to FIG. 4, in conjunction with FIGS. 1-3, in step 401, boot code 309 is executed when container 303 is loaded.

In step 402, a determination is made by boot code 309 as to whether key 305 of container 303 is validated with commerce code 311. In one embodiment, boot code 309 includes code that communicates with an application programming interface (API) of commerce code 311 to determine whether container 303 is eligible for execution. API of commerce code 311 determines whether container 303 is eligible for execution based on validating key 305.

If key 305 cannot be validated, including the scenario when boot code 309 cannot locate the commerce code API 311 in isolation code 310, then, in step 403, boot code 309 logs an error and terminates container 303.

If, however, key 305 is validated, then, in step 404, boot code 309 allows container 303 to execute.

Upon container 303 executing, container 303 requests to be serviced by isolation code 310 as discussed further below. The licensing terms associated with executing container 303 can be enforced as discussed below in connection with FIG. 5.

FIG. 5 is a flowchart of a method 500 for enforcing the licensing terms when distributing content, such as applications 304 (FIG. 3) in container 303 (FIG. 3), in accordance with an embodiment of the present invention.

Referring to FIG. 5, in conjunction with FIGS. 1-3, in step 501, commerce code APIs 311 receive a request for service from container 303 after container 303 is executed.

In step 502, a determination is made by commerce code APIs 311 as to whether container 303 has a key 305.

If container 303 does not have a key 305, then, in step 503, container 303 is executed without interface from commerce code APIs 311. In this manner, non-commerce enabled images (i.e., those images of container 303 that do not possess a key 305 that needs to be validated by commerce code 311) may be able to run unhindered.

If, however, container 303 has a key 305, then, in step 504, commerce code APIs 311 read key 305 of container 303 to retrieve checksum 306 to confirm that the contents, such as applications 304, have not changed.

In step 505, a determination is made by commerce code APIs 311 as to whether the contents of container 303, such as applications 304, have changed.

If the contents of container 303 have changed, then in step 506, commerce code APIs 311 does not allow container 303 to execute and logs an error code.

If, however, the contents of container 303 have not changed, then, in step 507, commerce code APIs 311 read key 305 of container 303 to retrieve manifest 308 to confirm container 303 is allowed to be serviced by isolation code 310. As discussed above, manifest 308 includes a list of the contents of container 303 as well as the security credentials of container 303 thereby effectively proving the identity of container 303.

In step 508, a determination is made by commerce code APIs 311 as to whether container's 303 credentials were validated. For example, the security credentials of container 303 in manifest 308 may include a security code that needs to be matched with a code accessed by commerce code APIs 311, such as a code stored in memory or storage of computing device 101 (e.g., memory 205 or disk unit 208).

If container's 303 credentials are not validated, then commerce code APIs 311 does not allow container 303 to execute and logs an error code in step 506.

If, however, container's 303 credentials are validated, then, in step 509, commerce code APIs 311 read key 305 of container 303 to retrieve licensing terms 307 to confirm container 303 is in compliance with licensing terms 307. In one embodiment, commerce code APIs 311 validate licensing terms 307 with licensing server 102, such as over network 103, by validating a license code applied to licensing terms 307. In another embodiment, commerce code APIs 311 validate licensing terms 307 locally, such as by processor 201. Once licensing terms 307 are validated, commerce code APIs 311 determines whether container 303 is in compliance with those terms.

In step 510, a determination is made by commerce code APIs 311 as to whether container 303 is in compliance with licensing terms 307. In this manner, commerce code APIs 311 can enforce licensing terms 307, including restrictions and enforcement of payment to the licensor upon distributing content in container 303.

If container 303 is not in compliance with licensing terms 307, then, in step 511, commerce code APIs 311 do not allow container 303 to execute. In this manner, commerce code APIs 311 prevent container 303 from executing if container 303 is not in compliance with licensing terms 307 thereby providing a means for enforcing licensing terms 307.

If, however, container 303 is in compliance with licensing terms 307, then, in step 512, commerce code APIs allow container 303 to execute.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for enforcing licensing terms when distributing content via a container image running in a container, the computer program product comprising a computer readable storage medium having program code embodied therewith, the program code comprising the programming instructions for:

executing a boot code upon loading said container, wherein said boot code is an execution entry point of said container;

determining whether a key of said container is validated with commerce code by said boot code, wherein said key comprises licensing terms applied to said contents of said container; and allowing said container to execute in response to said key being validated.

2. The computer program product as recited in claim 1, wherein said boot code comprises code that communicates with an application programming interface of said commerce code to determine whether said container is eligible for execution.

3. The computer program product as recited in claim 2, wherein said application programming interface of said commerce code determines whether said container is eligible for execution based on validating said key.

4. The computer program product as recited in claim 3 further comprising:

logging an error and terminating said container in response to not validating said key.

5. The computer program product as recited in claim 1, wherein the program code further comprises the programming instructions for:

receiving a request for a service from said container in response to said container being allowed to execute in response to said key being validated, wherein contents of said container comprise an assemble of applications;

reading said key of said container in response to receiving said request for said service; and allowing said container to execute in response to confirming said container is in compliance with said licensing terms.

6. The computer program product as recited in claim 5, wherein said licensing terms are validated locally or with a licensing server.

7. The computer program product as recited in claim 6, wherein said key further comprises a checksum and a manifest listing said contents of said container and credentials of said container.

8. The computer program product as recited in claim 7, wherein the program code further comprises the programming instructions for:

reading said key to retrieve said checksum to confirm said contents of said container have not changed; and reading said key to retrieve said manifest to confirm said container is allowed to be serviced by isolation code, wherein said isolation code is a program to limit, account and isolate resource usage of process groups.

9. The computer program product as recited in claim 8, wherein the program code further comprises the programming instructions for:

preventing said container from executing in response to said checksum indicating said contents of said container have changed or in response to said manifest indicating said container is not allowed to be serviced by said isolation code; and logging an error code in response to said preventing of said container from executing.

10. The computer program product as recited in claim 1, wherein commands from said container are encrypted, wherein said encrypted commands are decrypted by an application programming interface of said commerce code within isolation code, wherein said isolation code is a program to limit, account and isolate resource usage of process groups.

11. A system, comprising:
a memory unit for storing a computer program for enforcing licensing terms when distributing content via a container image running in a container; and
a processor coupled to the memory unit, wherein the processor is configured to execute the program instructions of the computer program comprising:
  executing a boot code upon loading said container, wherein said boot code is an execution entry point of said container;
  determining whether a key of said container is validated with commerce code by said boot code, wherein said key comprises licensing terms applied to said contents of said container; and
  allowing said container to execute in response to said key being validated.

12. The system as recited in claim 11, wherein said boot code comprises code that communicates with an application programming interface of said commerce code to determine whether said container is eligible for execution.

13. The system as recited in claim 12, wherein said application programming interface of said commerce code determines whether said container is eligible for execution based on validating said key.

14. The system as recited in claim 13, wherein the program instructions of the computer program further comprise:
  logging an error and terminating said container in response to not validating said key.

15. The system as recited in claim 11, wherein the program instructions of the computer program further comprise:
  receiving a request for a service from said container in response to said container being allowed to execute in response to said key being validated, wherein contents of said container comprise an assemble of applications;
  reading said key of said container in response to receiving said request for said service; and
  allowing said container to execute in response to confirming said container is in compliance with said licensing terms.

16. The system as recited in claim 15, wherein said licensing terms are validated locally or with a licensing server.

17. The system as recited in claim 16, wherein said key further comprises a checksum and a manifest listing said contents of said container and credentials of said container.

18. The system as recited in claim 17, wherein the program instructions of the computer program further comprise:
  reading said key to retrieve said checksum to confirm said contents of said container have not changed; and
  reading said key to retrieve said manifest to confirm said container is allowed to be serviced by isolation code, wherein said isolation code is a program to limit, account and isolate resource usage of process groups.

19. The system as recited in claim 18, wherein the program instructions of the computer program further comprise:
  preventing said container from executing in response to said checksum indicating said contents of said container have changed or in response to said manifest indicating said container is not allowed to be serviced by said isolation code; and
  logging an error code in response to said preventing of said container from executing.

20. The system as recited in claim 11, wherein commands from said container are encrypted, wherein said encrypted commands are decrypted by an application programming interface of said commerce code within isolation code, wherein said isolation code is a program to limit, account and isolate resource usage of process groups.

* * * * *